INVENTOR.
RALPH C. WESTER

May 1, 1956 R. C. WESTER 2,743,932
SPREADER
Filed Sept. 7, 1950 3 Sheets-Sheet 2
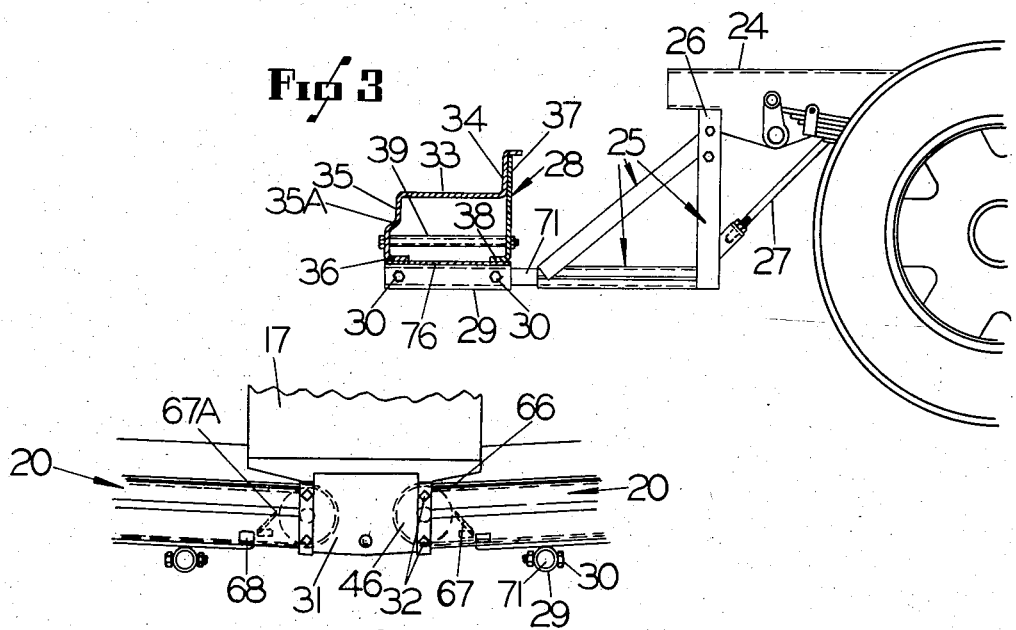
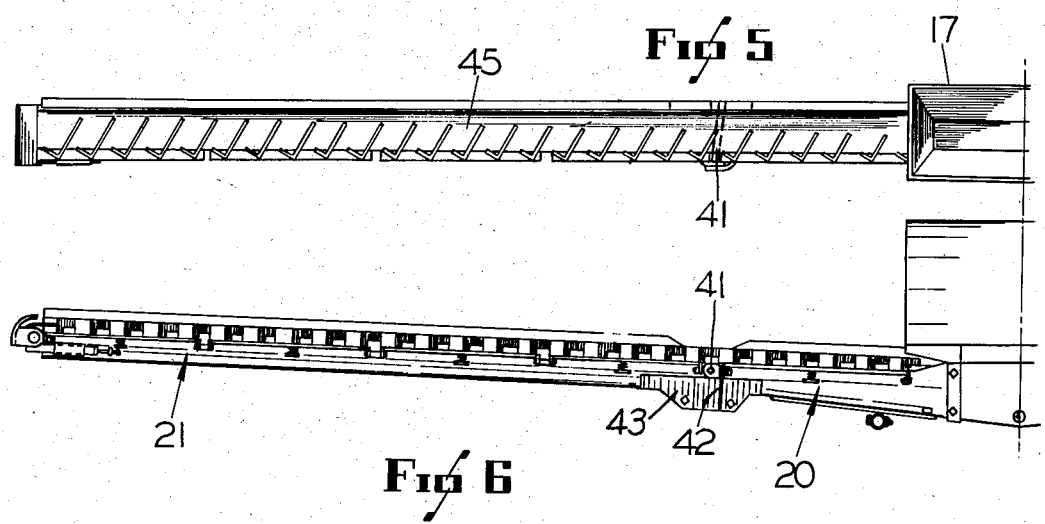
INVENTOR.
RALPH C. WESTER
BY

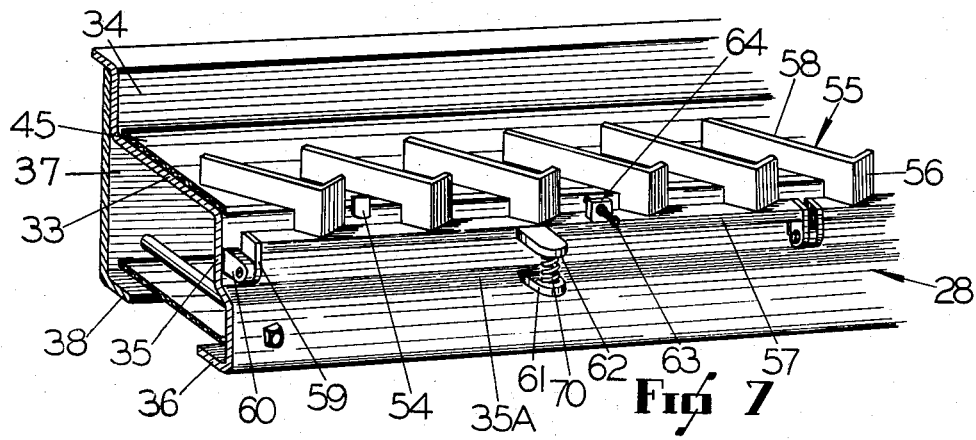
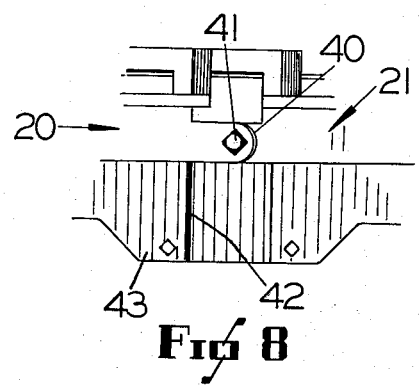
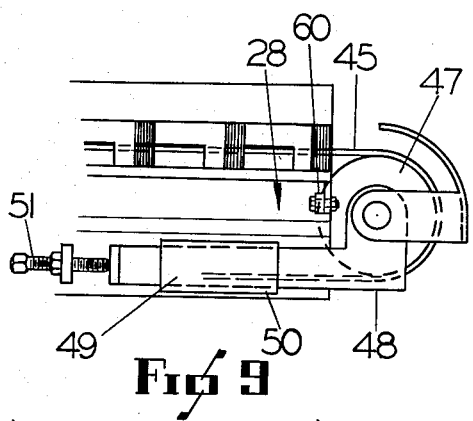
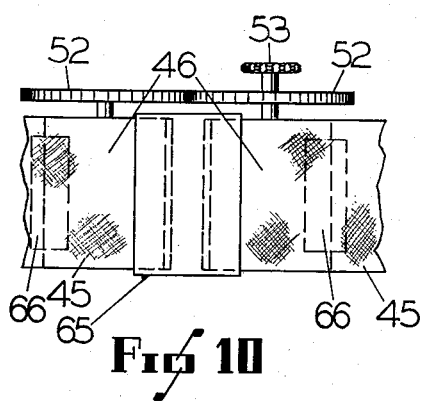
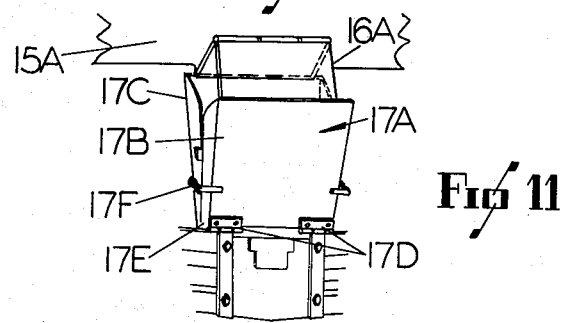
INVENTOR.
RALPH C. WESTER

United States Patent Office 2,743,932
Patented May 1, 1956

2,743,932

SPREADER

Ralph C. Wester, Plain City, Ohio, assignor, by mesne assignments, to William M. Quinn, Sidney, Ohio Application September 7, 1950, Serial No. 183,613

3 Claims. (Cl. 275—2)

My invention relates to a spreader. It has to do, more particularly, with a spreader for use in distributing material over a selected surface, for example, in distributing fertilizer over a field. It is especially useful in handling light-weight fertilizer in powdered form which is very difficult to handle.

Many spreading devices have been developed in the past which attach to the rear end of truck bodies for distributing fertilizer directly from the trucks onto a farmer's field. These prior art attachments are ordinarily one of two types. One common type is a horizontally disposed disc-like rotatable spreader which is disposed below the discharge opening of the truck bed and upon which the material is gradually discharged from the bed. This type of spreader acts on the centrifugal force principle and flings the material in all directions into the air. Obviously, much of the material is blown away, especially if it is light-weight fertilizer, and is lost or is not spread uniformly. The other type of spreader commonly in use is the screw-feed type which consists of a tube that is mounted transversely of the truck and is provided with an opening midway between its ends for receiving material discharged from the truck. A rotatable screw is provided in the tube and is composed of two sections which feed the material along the tube in both directions. The tube is provided with discharge openings and an attempt is made to so arrange these openings, as to size and position, along the tube so as to distribute the material uniformly. However, the openings become clogged with material, especially if it is damp, with the result that uniform distribution does not occur.

It is the main object of my invention to provide a spreader which is especially useful for spreading light-weight powdered material in such a manner that it will be deposited directly on the surface with little possibility of it being blown away and in such a manner that it will be distributed uniformly throughout the length of the spreader.

Another object of my invention is to provide a spreader of the type indicated above which is of such construction that there will be no danger of clogging, even with damp material, and, consequently, the spreader will always distribute the material uniformly when it is operating.

Another object of my invention is to provide a spreader of the type indicated above which is designed as an attachment for a truck that can be secured to the truck frame for receiving material discharge from the truck bed.

Still another object of my invention is to provide a spreader attachment for a truck which in operative or spreading position will extend transversely thereof and spread the material throughout a wide path following the truck but which can be folded into transporting or inoperative position where it will be confined substantially within the width of the truck so as not to interfere with normal driving of the truck.

A further object of my invention is to provide a spreader which is of a rugged nature and can be mounted rigidly on a truck frame and which is so designed that all the parts are protected from undue wear.

An additional object of my invention is to provide a spreader of the type indicated which is of simple structure and can be manufactured at low cost.

Various other objects will be apparent.

According to my invention, I provide a spreading attachment which can be attached easily and firmly to the rear end of a truck frame. The attachment includes a hopper which receives the material and directs it to the spreading structure. This structure includes right- and left-hand feeding units which are arranged to feed the material in both directions from the hopper and to spread it uniformly. Each unit is composed of an inner section rigidly attached to the truck frame and an outer section hinged to the inner section. During transportation on the truck, the outer sections are swung upwardly into inoperative position. During spreading, the outer sections are swung downwardly in extended condition.

Each feeding unit comprises an endless continuously driven feed belt which receives the material from the hopper and carries it outwardly away therefrom. On top of the belt a plurality of baffles are disposed in augular relationship to the direction of movement of the belt so as to scrape material therefrom and direct it off the side of the belt where it will drop to the surface to be treated. To insure uniform spreading along the length of the unit, the baffles extend over the belt progressively increasing distances, from the inner end of the unit to its outer end, so that each baffle scrapes from the belt a uniform amount of material. The baffles are supported in association with the belt in groups, each group being so mounted that the baffles thereof can yield upwardly if necessary to prevent stoppage of the belt, for example, if a small pebble wedges beneath one of the baffles, and also to prevent belt wear. Also, this arrangement in groups, facilitates folding of the outer sections.

The preferred embodiment of my invention is illustrated in the accompanying drawings wherein similar characters of reference designate corresponding parts and wherein:

Figure 3 is a transverse section through the spreader substantially along line 3—3 of Figure 2 showing mainly how the spreader is attached to the truck frame.

Figure 4 is a side elevational view illustrating the inner ends of the right- and left-feeding units of the spreader and the associated feed hopper.

Figure 5 is a plan view of the left feeding unit in extended condition.

Figure 6 is a side elevational view of the structure of Figure 5.

Figure 7 is a perspective view showing details of the feeding unit including the belt and associated material directing baffles.

Figure 8 is a detail in side elevation illustrating the hinge structure which connects the two sections of each feeding unit.

Figure 9 is a detail in side elevation illustrating the take-up arrangement provided for each belt.

Figure 10 is a detail in plan illustrating the driving means for the two belts.

Figure 11 is a perspective view illustrating a different hopper arrangement on my attachment when it is used on a dump truck.

Figure 1:
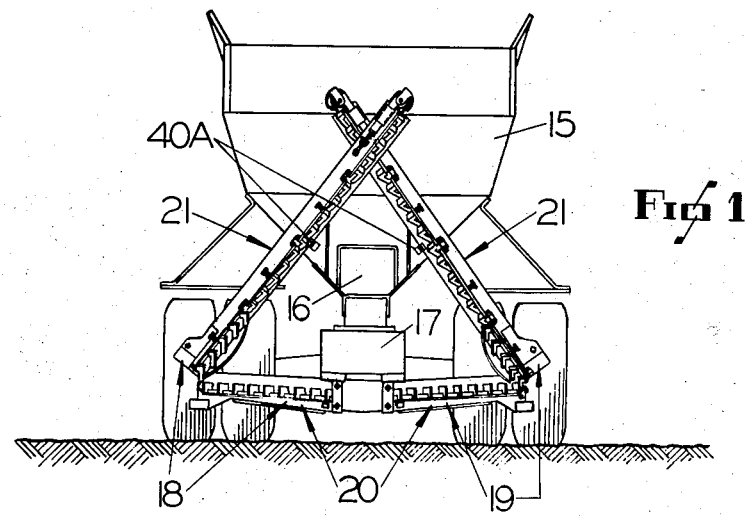
Figure 1 is an elevational view showing my spreading attachment on the rear end of a truck, the attachment being in folded or transporting condition.
Figure 2:
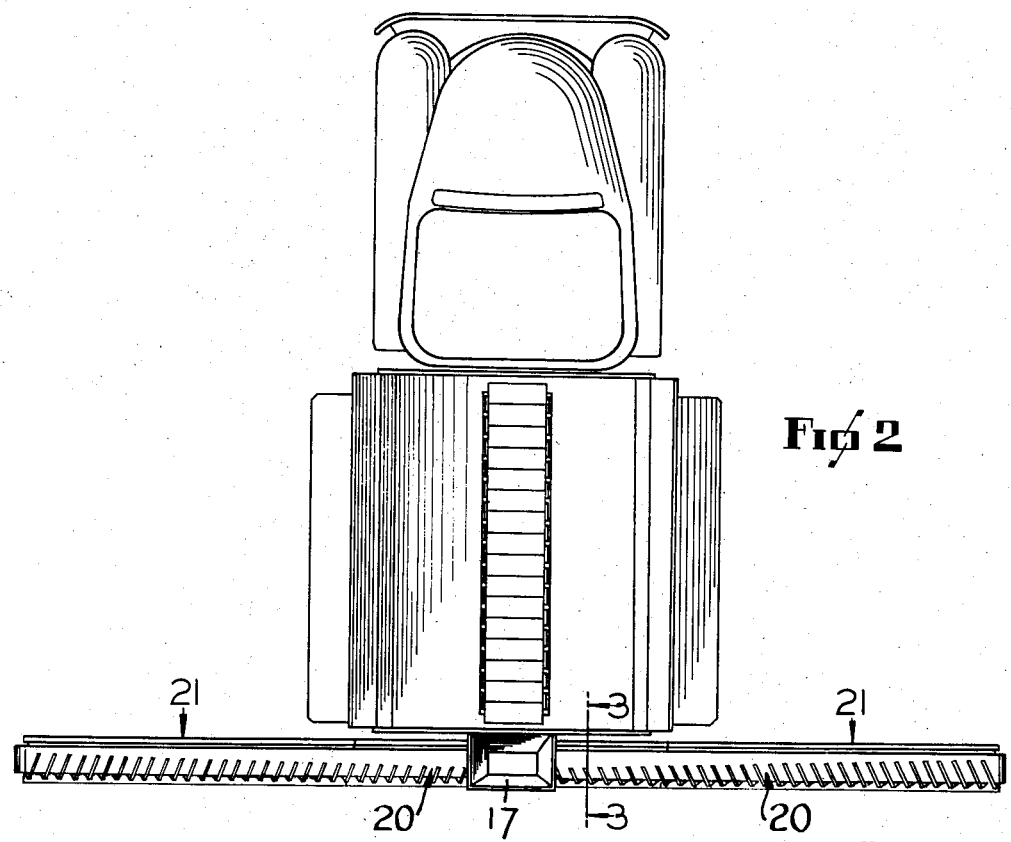
Figure 2 is a plan view of the truck with the attachment at the rear thereof in extended or spreading condition.

With reference to the drawings, in Figures 1 and 2,

I have illustrated an example of a truck to which my attachment may be applied. This truck is of the type usually employed for hauling fertilizer, such as powdered lime or other light-weight material, and includes the bed or box 15 which is designed to feed the fertilizer rearwardly through a gate 16 when the gate is open. With this type of truck, the box or bed 15 does not tilt.

My spreading attachment is mounted on the frame of the truck at the rear side thereof and includes generally a central receiving hopper 17, a left-hand feeding unit 18 and a right-hand feeding unit 19. Each of the units includes an inner section 20 and an outer section 21 hinged thereto. For transportation on the truck, the units 21 are swung upwardly into overlapping relationship, as shown in Figure 1, while for the spreading operation the units 21 are swung downwardly, as shown in Figure 2, so that they will feed and distribute the material beyond opposite sides of the truck at the rear thereof. It will be noted from Figure 1 that when the attachment is in transporting position it is disposed substantially completely within the width of the truck.

In Figures 3 and 4, I have illustrated how my attachment is mounted on the truck frame. Attached to the truck frame 24 are triangular brackets 25. These brackets are suspended from the frame at 26 and are braced by rods 27. The lower arm of each bracket carries a rearwardly extending rod 71. The frame 28 of each of the spreader sections 20 is supported by these rods 71. It will be noted that the frame 28 has on its lower side transversely disposed sleeves 29 which slip over the rods 71. The sleeves are retained on the rods 71 by means of screw bolts 30. As shown in Figure 4, the inner ends of the two sections 20 are rigidly connected together by a box-like connecting structure 31 which is rigidly secured to each section by bolts 32. As shown in Figure 4, the hopper 17 is supported by the adjacent ends of frames 28 of the sections 20. With this supporting arrangement, the inner sections 20 can be moved forwardly or rearwardly on the rods 71 to adjust the hopper 17 properly relative to the discharge gate 16 of the truck bed or box 15.

The frames 28 of all of the sections of the spreader are of the cross-sectional form illustrated in Figure 3. Each frame comprises a main horizontal plate 33 which has an upstanding flange 34 at its forward edge and a depending flange 35 at its rear edge. The flange 35 has a forwardly extending flange 36 at its lower edge. An upstanding forward plate 37 is provided which is welded to flange 34 and this plate has a flange 38 on its lower edge which is at the same level as flange 36 and extends towards it. The sleeves 29 are welded to a plate 76. Transversely extending spacer and bolt units 39 are provided between flange 35 and plate 37 to give the frame rigidity. It will be noted from Figure 7, however, that the frame of each of the outer sections 21 does not include the plate 76.

As previously indicated, the outer sections 21 of the spreader are hinged to the inner sections 20. Each hinge is illustrated generally in Figure 1 and in detail in Figure 8. Each of the inner sections 20 is provided with hinge lugs 40 which overlap the forward and rear sides of the frame of the outer section 21. A hinge pin 41 is passed through aligning openings in the lugs 40 and the frame 28 of the outer section 21 of the spreader. When the outer section 21 is swung downwardly, its downward movement is limited by means of the abutting edges 42 of the heavier stop blocks 43 provided on each side of the frame of each section. When the edges 42 are in contact, the inner section 20 and outer section 21 are in alignment, as shown in Figure 6, and extend upwardly and outwardly at a slight angle. It will be noted from Figures 2 and 5 that the hinge pins 41 are disposed at slight reversed angles relative to the longitudinal center line of the spreader so that when the sections 21 are folded upwardly, as shown in Figure 1, their upper ends will miss each other so that they can move into overlapping relationship. Movement of the outer sections 21 beyond the positions shown in Figure 1 is prevented by the stop arms 40a contacting with the flanges 34, the arms projecting from truck body 15.

Each of the spreader sections 18 and 19 comprises an endless feed belt 45 which extends from beneath the hopper 17 to the outer end of the outermost section 21, as shown in Figures 5 and 6. The belt passes around a driving roll 46 at its inner end, as shown in Figure 10, and an idler roll 47, shown best in Figure 9, which is carried at the outer end of the outermost section 21. The roll 47 is adjustable in and out relative to the frame 28 of the outer section 21 so as to adjust the tension of the belt. For this purpose, the roller is carried by L-shaped arms 48 which are mounted for longitudinal movement in guides 49 rigidly secured at 50 to the frame 28. An adjusting screw 51 is used for forcing the arms 48 outwardly to tighten the belt.

The rolls 46 are driven by means of gears 52 which, as shown in Figure 10, mesh with each other. One of the gears 52 is driven by means of a sprocket 53 from a suitable power take-off (not shown) on the truck.

It will be noted best from Figure 7 that the top plate 33 of frame 28 serves as a supporting surface for the upper flight of the belt 45. The lower flight of the belt is supported by the inwardly extending flanges 36 and 38. It will further be noted from this figure that the upstanding flange 34 at the forward edge of the belt will prevent displacement of material from that edge of the belt and will serve as a guide for that edge. Small upstanding clips 54 are welded to the depending flange 35 on the plate 33 and extend up beyond the plate 33 to prevent rearward displacement of the belt 45 from the plate 33. It will be noted that at this rear edge of the belt there is nothing to interfere with displacement of material from the belt downwardly over the flange 35 except the small clips 54. It will further be noted that flange 35 is provided with an outwardly directed angle 35a which will direct material downwardly and outwardly if it is shoved off the rear edge of the belt.

The belt will receive the material from the hopper 17 and to distribute this material evenly along the spreading unit, I provide means for shoving it off the rear edge of the belt. This means, as shown generally in Figures 2, 5, 6 and 7, comprises baffle members 55 which are disposed in angular relationship to the center line or direction of movement of the belt. The belt will feed outwardly and the baffles are preferably disposed at angles of 45° relative thereto. These baffles will scrape the top surface of the belt and will direct the material therefrom rearwardly over the rear edge thereof and over the flanges 35 of the frames 28. To insure uniform spreading along the length of the unit, as shown in Figures 2 and 5, the baffles extend over the belt progressively increasing distances from the hopper end thereof to the outer end thereof. The result is that each succeeding baffle scrapes from the belt a uniform amount of material since the hopper is of proper width to deposit the material evenly substantially across the width of the belt.

The manner in which these baffles are supported is illustrated best in Figure 7. The baffles are supported in groups, for example, five to a group although groups of other numbers may be provided. Each baffle member 55 comprises an upstanding supporting angular portion 56 at its outer end which is welded to a flat supporting bar 57 that extends longitudinally of the frame 28. Each baffle also includes an inwardly extending scraper arm 58 which is integral with portion 56 and which extends over the upper surface of the belt 45. The bar 57 is provided with depending lugs 59 at its ends which are pivoted to rearwardly extending lugs 60 that extend from the flange 35 above the angle 35a in the flange. To keep the scraper arms in resilient contact with the upper surface of the belt 45, a spring 70 is associated with each bar 57. This spring is a compression spring which is disposed between a rearwardly extending lug 61 on flange 35a of the frame and a rearwardly extending lug 62 on the bar 57. An adjustable stop screw 63 is carried by an upstanding lug 64 on the upper surface of the bar 57 and is adapted to engage the flange 35. By adjusting this screw, the arms 58 of the baffles may be permitted to contact lightly with the upper surface of the belt 45, this stop means serving to limit the force of contact of the arms 58 with the surface of the belt which is created by the spring 70 so as not to create undue wear thereon. In case any material works beneath the arms 58, the entire group of baffles 55 carried by the bar 57 may yield upwardly against the force of spring 70. Thus, clogging of the spreader and undue wear on the belt 45 is precluded.

It will be noted that the hopper 17 overlies the inner ends of both belts 45, as shown in Figure 2. As shown in Figures 4 and 10, the connecting box structure 31 between the adjacent inner ends of the inner sections 20 includes a plate 65 which covers the space between the inner ends of the belts so as to prevent dropping of material downwardly through such space.

Any material which happens to adhere to the belt can drop from the lower surface of the lower flight through the space provided between the flanges 36 and 38 of each of the outer sections 21. To prevent any material from getting beneath the upper flight of each belt, a transverse slot 66 is provided in the associated upper plate 33 just beyond the roll 46. This will permit material to drop through the plate as it is scraped off the belt by the slot edge and it will be deflected outwardly by means of a deflector 67 provided within the frame 28 and which will direct it through a side opening 68 provided in the flange 35. Deflector 67 also has an edge 67a which is adjacent roll 46 and will scrape material therefrom.

In Figure 11, I have illustrated how my attachment may be used on a dump truck. It is supported substantially as before and is of substantially the same construction. However, in this instance, when the bed 15a of the truck is raised, the discharge chute 16a thereof will swing down into the hopper 17a. The hopper is preferably made of a forward section 17b and a rear section 17c which are independently hinged at 17d and 17e, respectively, and which have sides that overlap each other. These hopper sections are normally urged towards each other by spring units 17f at each side but can yield relatively to each other if the chute 16a strikes either section.

It will be apparent that my spreader will function to spread the material supplied by the truck in both directions and will discharge it from each spreading unit 18 and 19 uniformly along its length due to the particular baffle arrangement. The baffles extend forwardly over the belt and are angled in a direction opposite to the direction of movement thereof. The result is that they deflect the material off the rear edge of the belt. The material is not discharged through openings which might become clogged. The material is discharged directly onto the ground and is not thrown into the air as it is with centrifugal spreaders. Thus, there is less waste and uniform distribution. The uniform distribution results from the fact that the baffles extend over the belt progressively increasing distances from its inner end to its outer end. The belt 45 is protected from excessive wear since the baffles 55 can be adjusted so that they merely lightly contact the belt. In case large particles of material move beneath the baffles, the baffles can yield upwardly to prevent excessive wear on the belt.

The spreader can be folded into inoperative position (Figure 1) where it will be completely within the width of the truck so as to facilitate transportation. When each of the outer sections 21 of the spreading unit is folded upwardly, the innermost group of baffles 55 carried thereby is swung upwardly and outwardly to prevent interference at the hinge joint of the innermost baffle thereof with the outermost baffle on the adjacent inner unit 20 and cutting of the belt.

It will be apparent from the above that my spreading attachment has many advantages, some of which have been discussed and others of which will be apparent.

Having thus described my invention, what I claim is:

1. An attachment for a truck having a body with means for discharging material therefrom at the rear thereof, comprising a hopper for receiving the material, a pair of spreading units, each spreading unit including an endless belt for receiving the material fed from the hopper, a frame attached to said truck supporting the belt for movement transversely of the truck, each of said spreading units extending in opposite directions from the hopper which is at the center of the truck, each of said spreading units including a fixed inner section and an outer section hinged thereto so that it can be swung upwardly, means for directing material from the belt off an edge thereof, said means comprising baffles extending over the belt in angular relation thereto, said baffles arranged in independent groups carried by the sections, a support being provided for each group of baffles and comprising a pivoted bar which will permit movement of the baffles away from the belt, and resilient means for yieldingly mounting said support adjacent said belt to permit upward yielding of said baffles away from the belt so as to prevent clogging of material between the belt and baffles, to prevent undue wear on the belt, and to normally urge said pivoted bar in one direction to cause said baffles to be in cooperation with the belt.

2. An attachment according to claim 1 including a stop between each bar and the frame to limit pivotal movement thereof.

3. An attachment according to claim 2 in which the belt of each spreading unit is supported on a frame which includes a plate for supporting the upper flight and a pair of spaced flanges for supporting the lower flight, said plate having a slot adjacent the inner belt supporting roll which permits material to drop therethrough.

References Cited in the file of this patent

UNITED STATES PATENTS

| | | |
|---|---|---|
| 2,280,234 | Harvey | Apr. 21, 1942 |
| 2,400,646 | Klein | May 21, 1946 |
| 2,416,898 | Breeze | Mar. 4, 1947 |
| 2,500,681 | Hoffstetter | Mar. 14, 1950 |
| 2,538,961 | Biszantz et al. | Jan. 23, 1951 |

FOREIGN PATENTS

| | | |
|---|---|---|
| 10,047 | Great Britain | Jan. 30, 1913 |